(12) United States Patent
Morimoto et al.

(10) Patent No.: US 6,443,126 B1
(45) Date of Patent: Sep. 3, 2002

(54) MOTOR CONTROL APPARATUS COMBINED TO ENGINE

(75) Inventors: Kazuhiko Morimoto; Yoshiaki Omata, both of Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 3 days.

(21) Appl. No.: 09/672,633

(22) Filed: Sep. 28, 2000

(30) Foreign Application Priority Data

Sep. 30, 1999 (JP) .......................................... 11-279422

(51) Int. Cl.$^7$ ............................................. F02D 41/16
(52) U.S. Cl. ............................ 123/339.15; 123/339.19; 180/65.2
(58) Field of Search ................. 123/339.19, 339.21, 123/339.14, 192.1, 339.18; 322/25, 27, 28; 180/197; 701/87

(56) References Cited

U.S. PATENT DOCUMENTS

| 5,839,533 A | 11/1998 | Mikami et al. .............. 180/165 |
| 5,841,201 A | 11/1998 | Tabata et al. .................. 290/40 |
| 5,895,333 A | 4/1999 | Morisawa et al. ............. 475/5 |
| 5,935,040 A | 8/1999 | Tabata et al. ................... 477/3 |
| 6,109,237 A | * 8/2000 | Pels et al. ............... 123/339.19 |
| 6,234,932 B1 | 5/2001 | Kuroda et al. |

FOREIGN PATENT DOCUMENTS

| JP | 5-106474 | 4/1993 |
| JP | 5-236672 | 9/1993 |
| JP | 6-343300 | 12/1994 |
| JP | 10-23604 | 1/1998 |
| JP | 10-136508 | 5/1998 |
| JP | 11-41992 | 2/1999 |

* cited by examiner

Primary Examiner—Andrew M. Dolinar
Assistant Examiner—Johnny H. Hoang
(74) Attorney, Agent, or Firm—Flynn, Thiel, Boutell & Tanis, P.C.

(57) ABSTRACT

A motor control apparatus combined with an engine controls both driving and power-generation functions of an electric motor. The motor control apparatus has a determining control for determining an idling state of the engine including an engine rotational speed-detector for detecting engine rotational speed. The control can return the engine rotational speed to a predetermined rotational speed value. The control varies the engine rotational speed by changing an operating state of the motor when an engine rotational speed measured by a detection signal from the engine rotational speed-detector varies from a predetermined rotational speed value for an idling mode of the engine. The engine rotational speed in the idle state becomes essentially constant, and the quietness of the engine is increased.

15 Claims, 17 Drawing Sheets

FIG. 9

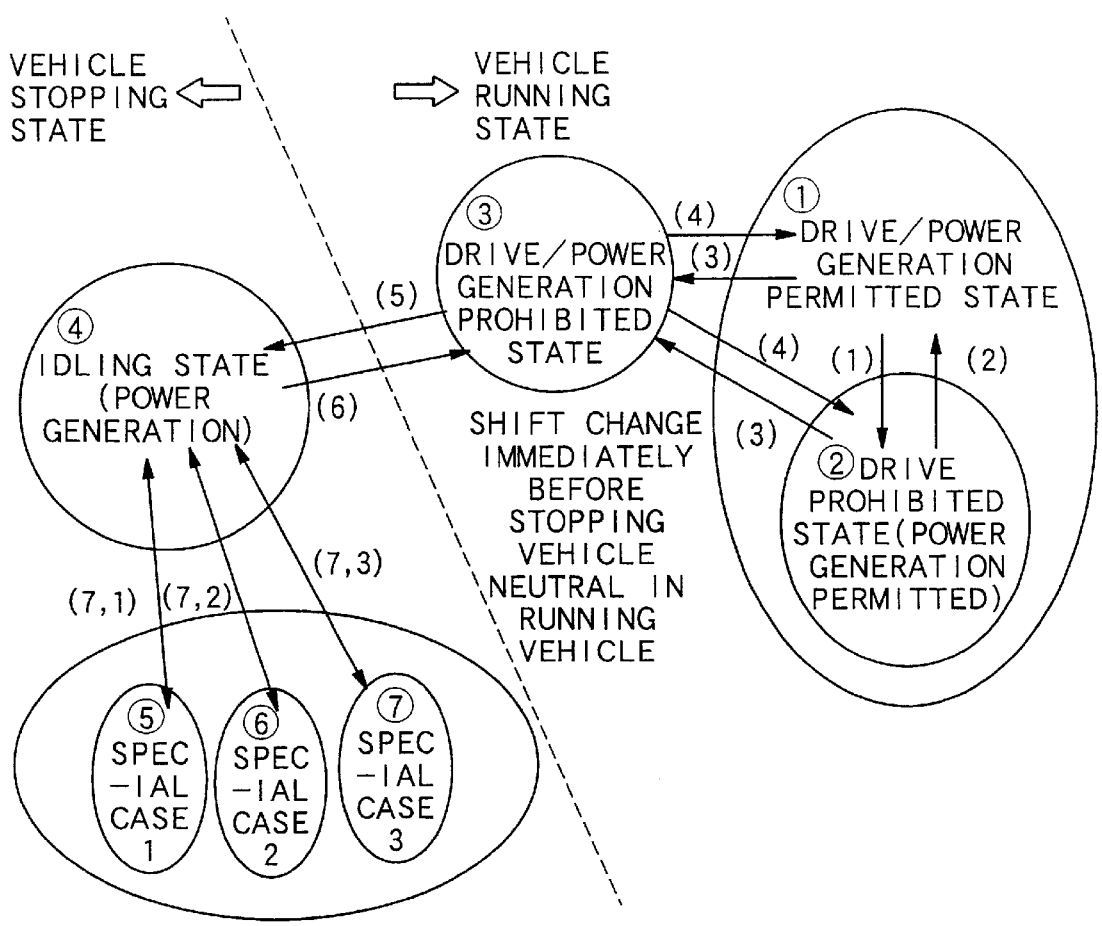

① DRIVE/POWER GENERATION PERMITTED:DRIVE/POWER GENERATION CONTROL

② DRIVE PROHIBITED(POWER GENERATION PERMITTED): POWER GENERATION CONTROL(VEHICLE RUNNING)

③ DRIVE/POWER GENERATION PROHIBITED:MOTOR CONTROL PROHIBITED

---

④ IDLING:POWER GENERATION CONTROL

⑤ SPECIAL CASE 1(VEHICLE STARTING STATE): DRIVING CONTROL

⑥ SPECIAL CASE 2(ENGINE STARTING STATE):DRIVING CONTROL (VEHICLE STATIONARY)

⑦ SPECIAL CASE 3(IDLING STABILIZING CONTROL STATE): DRIVING CONTROL

| MAP | DRIVING TORQUE |
|---|---|
| MOTOR SPEED | PREDETERMINED VOLTAGE |

| MAP | DRIVING TORQUE |
|---|---|
| MOTOR SPEED | MAXIMUM VOLTAGE VARIATION VALUE |

FIG. 14
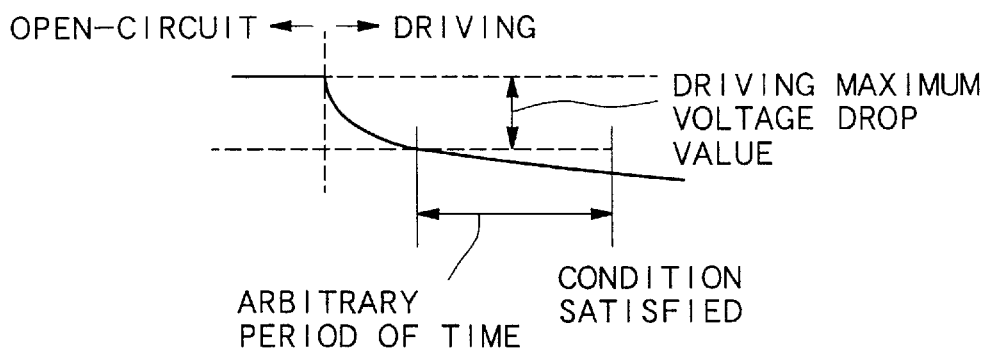
FIG. 15
| MAP | DRIVING TORQUE |
|---|---|
| MOTOR SPEED | MAXIMUM VOLTAGE DROP VALUE |
FIG. 16
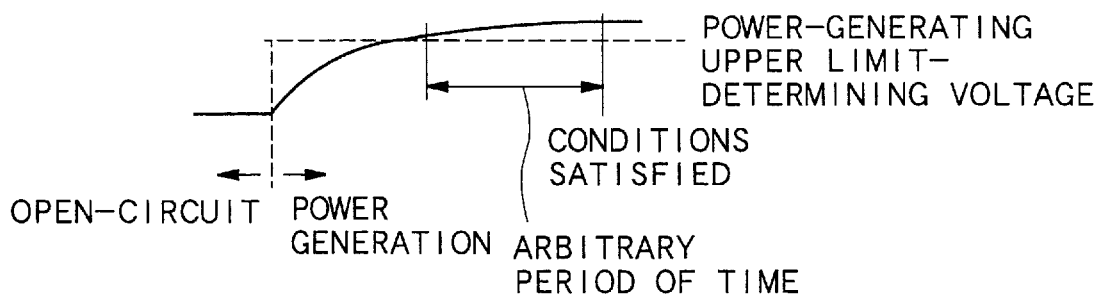
FIG. 17
| MAP | POWER-GENERATING TORQUE |
|---|---|
| MOTOR SPEED | UPPER LIMIT- DETERMINING VOLTAGE |

\* Sn~Sn' IS DETERMINED APPROPRIATELY, CONSIDERING A RUNNING RADIUS OF A TIRE AND A SENSOR ERROR RATE.

FIG. 20

FOLLOWING TABLE SHOWS START-ASSIST SWITCHOVER AND START-ASSIST CANCELLATION CONDITIONS.

A PART MODIFIED IS REFLECTING CLUTCH-CUT-FLAG MODE IN A SWITCHOVER CONDITION.

| | VEHICLE VELOCITY | MOTOR SPEED | CLUTCH-SW1 | CLUTCH-SW2 | BRAKE-S/W | IDLE-S/W | GEAR | TORQUE INSTRUCTION | NOTE |
|---|---|---|---|---|---|---|---|---|---|
| SWITCHOVER CONDITION | 4.5km/h UNDER | 100~1700rpm | ON | ON AND CLUTCH-CUT FLAG:ON | OFF | OFF | | MAP-AST | |
| CANCELLATION CONDITION | •10km/h UP •1~10km/h FOR 10s | 1750rpm UP | OFF→ON | OFF | ON | ON | | | |

US 6,443,126 B1

MOTOR CONTROL APPARATUS COMBINED TO ENGINE

CROSS REFERENCE TO RELATED APPLICATIONS

This application is related to co-pending patent applications Ser. No. 09/672,631 and Ser. No. 09/672,634, both titled "MOTOR CONTROL APPARATUS COMBINED TO ENGINE" and both filed Sep. 28, 2000. The disclosures of the related applications are, in their entirety, incorporated herein by reference.

FIELD OF THE INVENTION

This invention relates to a motor control apparatus combined with an engine, particularly to a motor control apparatus combined with an engine, in which the engine rotational speed in the idling state is controlled to be constant, so that the stillness or quietness of the noise from the engine is improved.

BACKGROUND OF THE INVENTION

Some motor vehicles are of a type commonly called a hybrid vehicle having an internal combustion engine and an electric motor (referred to as motor throughout the specification) combined with the engine. The engine and motor are disposed in the vehicle as the power sources of a propulsion system. The hybrid vehicle further includes an engine control means for controlling a running state of the engine and a motor control means for controlling an operating state of the motor. The engine controller and the motor controller detect respective operating states of the engine and the motor when the vehicle is traveling, and then exchange such detected data regarding the running states. As a result, the respective operating states of the engine and the motor are controlled in association with each other. Such a control system attains a high level of required performance (such as fuel efficiency, lower values of detrimental components in exhaust gases, and power performance).

One such example of a control apparatus for a vehicle is disclosed in published Japanese Patent Application Laid-Open No. 5-106474. A power train consists of a tandem connection of an engine with switchable output characteristics and an automatic transmission. Power from a variable output characteristic engine is speed-changed by the automatic transmission. A stall start detecting means detects a stall start in the power train and controls a characteristic restricting means that prohibits the selection of an output characteristic enlarging torque. The engine does not output increased torque at the time of the stall start and degradation of parts in a driving system can be eliminated.

In published Japanese Patent Application Laid-Open No. 10-136508, the power generating control apparatus for a vehicle, including a control apparatus of an AC generator for a vehicle having both a magnetization control circuit for a magnetic field coil and a three aspect full-wave rectification diode, has the following means:

(a) a magnetizing current ratio control means varying a magnetizing current ratio of a magnetization control circuit in a charge voltage of the capacitor charging by a signal from a pulse generating means;
(b) an electric current increase detecting means for detecting an increase of the electric current when one was conductive at least at a minus (−) side of a three aspect full-wave rectification diode; and
(c) magnetizing current ratio increase limit means for reducing an increasing rate of the magnetizing current ratio of the magnetization control circuit, by varying an electric current of the capacitor in the magnetizing current ratio control means when an increase of the electric current is detected.

In a power generating control apparatus for a vehicle, this apparatus detects a sudden increase of electricity load surely and directly, and quickly reduces an increase in engine torque, and controls the magnetizing current ratio of a magnetic field coil according to an engine rotational speed.

Published Japanese Patent Application Laid-Open No. 6-343300 discloses a power generating control apparatus for an internal combustion engine that includes an operation signal output means to output an operation signal in the operation of an electricity load using the output of a power generating unit by an engine drive. A power supply for the output of the power generating unit is charged. A control means stabilizes an engine idling speed by increasing a fuel supply to the engine when an operation signal is output from the operation signal output means during idling of an engine. When an operation signal is output from the operation signal output means during idling of an engine, the control means has an output voltage control function controlling so as to gradually return to the original output voltage in a predetermined time after being controlled, so as to vary a magnetic field electric current of the power generating unit and so as to reduce an output voltage of the power generating unit. By this control means, the stabilization of engine idling speed is planned while restraining fuel consumption in the electricity load operation at engine idling, and an improvement of fuel efficiency is expected.

Also, published Japanese Patent Application Laid-Open No. 10-23604 discloses a control means of a hybrid vehicle that has an engine running by combustion of fuel and an electric motor operating with electric energy as power source for vehicle traveling, and disposes an engine stall determining means to judge the possibility of engine stall during a running operation of the engine. An engine stall prevention motor control means reduces a load of an engine by an electric motor when it is judged by the engine stall determining means that the engine may stall, for preventing the engine stall beforehand.

In published Japanese Patent Application Laid-Open No. 11-41992, a mixed-supply system by an engine driving generator and a battery, using an engine generating unit as a supporting power supply, controls so as to operate a loaded motor or something loaded and so as to do a supporting charge to a battery of a stationary type or laying-on-vehicle type, and so as to control by a hand-operated control unit, in order to maintain a battery in a good accumulation of electricity state. And, the system does a measuring of the battery by sensing an accumulation of electrical charge with an electricity state measuring device controlled by a control mode set inside of a center control unit, and compares with its measured signal value a predetermined value. Moreover, the relative control running to an engine drive power generating unit, improves an electricity supply ability for a load condition, and hereby, an inconvenience of charge may be cancelled, and a function of system running may be improved.

In a usual motor control means combined with an engine, as mentioned in published Japanese Patent Application Laid-Open No. 10-023604, the control means has the engine stall determining means judging the possibility of engine stall, hereby, preventing the engine stall by using a motor generator (electric motor) when it is judged by the engine stall determining means that the engine may stall. In other words, the above control means controls the motor generator (an electric motor) so that an engine stall is not caused.

Here, the control means in above-mentioned published Japanese Patent Application Laid-Open No. 10-023604, has no stabilization control for engine rotational speed in idling, and has not considered vibration and noise in an idling state. As a result, there is the anxiety that quiet vehicle operation is lost in the control and this characteristic is disadvantageous in practical use.

An idling state is controlled fundamentally by an idle speed controller (ISC), but the ISC is not always enough because the control sensitivity and the control speed are influenced by pneumatic speed, therefore, a so-called idle stabilization to hold an engine rotational speed in an idling state at a predetermined constant value is necessary.

SUMMARY OF THE INVENTION

In order to obviate the above inconvenience, the present invention provides a motor control apparatus combined with an engine, the engine and an electrical motor having both driving and power-generation functions, and having a determining means for determining an idling state of the engine, comprising an engine rotational speed-detecting means for detecting an engine rotational speed; and, a control means controlling so as to return the engine rotational speed to the predetermined engine rotational speed, varying the engine rotational speed by changing an operating state of the motor, when the engine rotational speed output as a detection signal from the engine rotational speed-detecting means varies from a predetermined engine rotational speed set beforehand for the idling state of the engine.

According to the present invention as previously described, in case of the idling state of an engine, when the engine rotational speed measured by a detection signal from the engine rotational speed detecting means or an engine rotational speed sensor varies from a predetermined engine rotational speed set beforehand, then the control means controls so as to change the engine rotational speed by changing a running state of the motor, and the engine rotational speed is returned to the predetermined engine rotational speed. Hereby, the engine rotational speed in the idling state is converged to the predetermined engine rotational speed, and becomes constant in order to stabilize engine idling.

BRIEF DESCRIPTION OF THE DRAWINGS

FIG. 9 is a schematic diagram illustrating when switching over occurs in a control mode;

FIG. 14 is a time-chart showing when a maximum voltage variation value immediately after driving is lower than a main battery open-circuit voltage minus a driving voltage;

FIG. 15 is a map of a relation between driving torque and motor speed;

FIG. 16 is a time-chart showing when a power-generating main battery voltage continues to be greater than a power-generating upper limit-determining voltage (a set value for each power-generating torque) for an arbitrary period of time;

FIG. 17 is a map of a relation between driving torque and motor speed;

FIG. 20 is a map of a relation between driving torque and motor speed;

DETAILED DESCRIPTION

Figure 1:
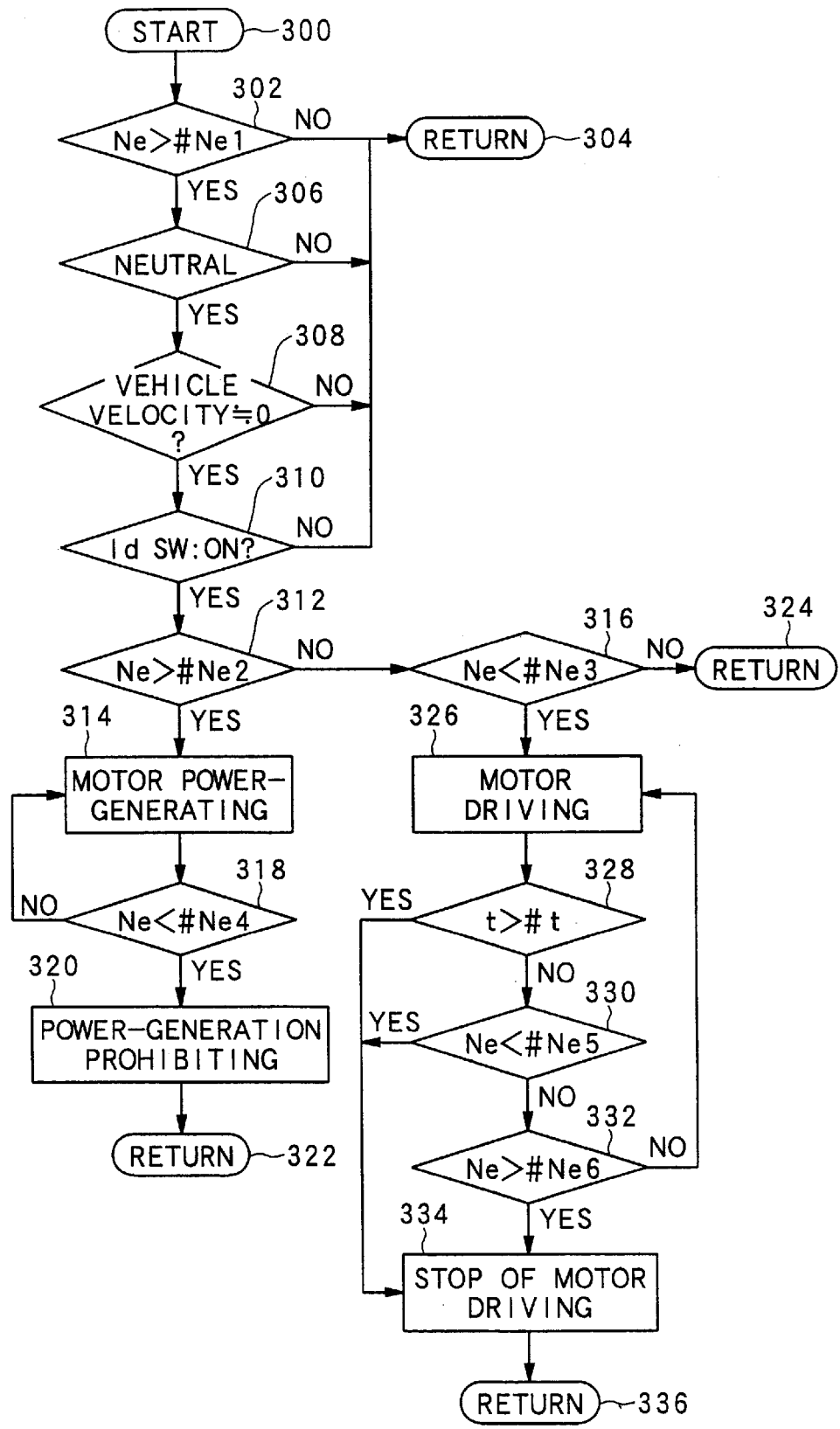
FIG. 1 is a speed stabilizing control flowchart in a motor control apparatus combined to an engine according to first embodiment of the present invention.

Embodiments of the present invention will now be described in detail with reference to the drawings.

FIGS. 1–20 illustrate one of the embodiments of the present invention. In FIG. 5, reference numeral 2 denotes a vehicle-propulsion system for a vehicle (not shown); 4 denotes an internal combustion engine; 6 denotes an electric motor (referred to as "motor" hereafter) combined with the engine; 8 denotes a clutch; and 10 denotes a manually operated transmission. The vehicle has the engine 4 and the motor 6 disposed therein as the vehicle-propulsion system 2. The motor 6 has both a drive function and a power-generating function.

The motor 6 is connected directly to the engine 4. The transmission 10 is linked to the motor 6 through the clutch 8. The engine 4 includes an alternator 12, an air-conditioner (A/C) compressor 14, and a starter motor 16.

Figure 2:
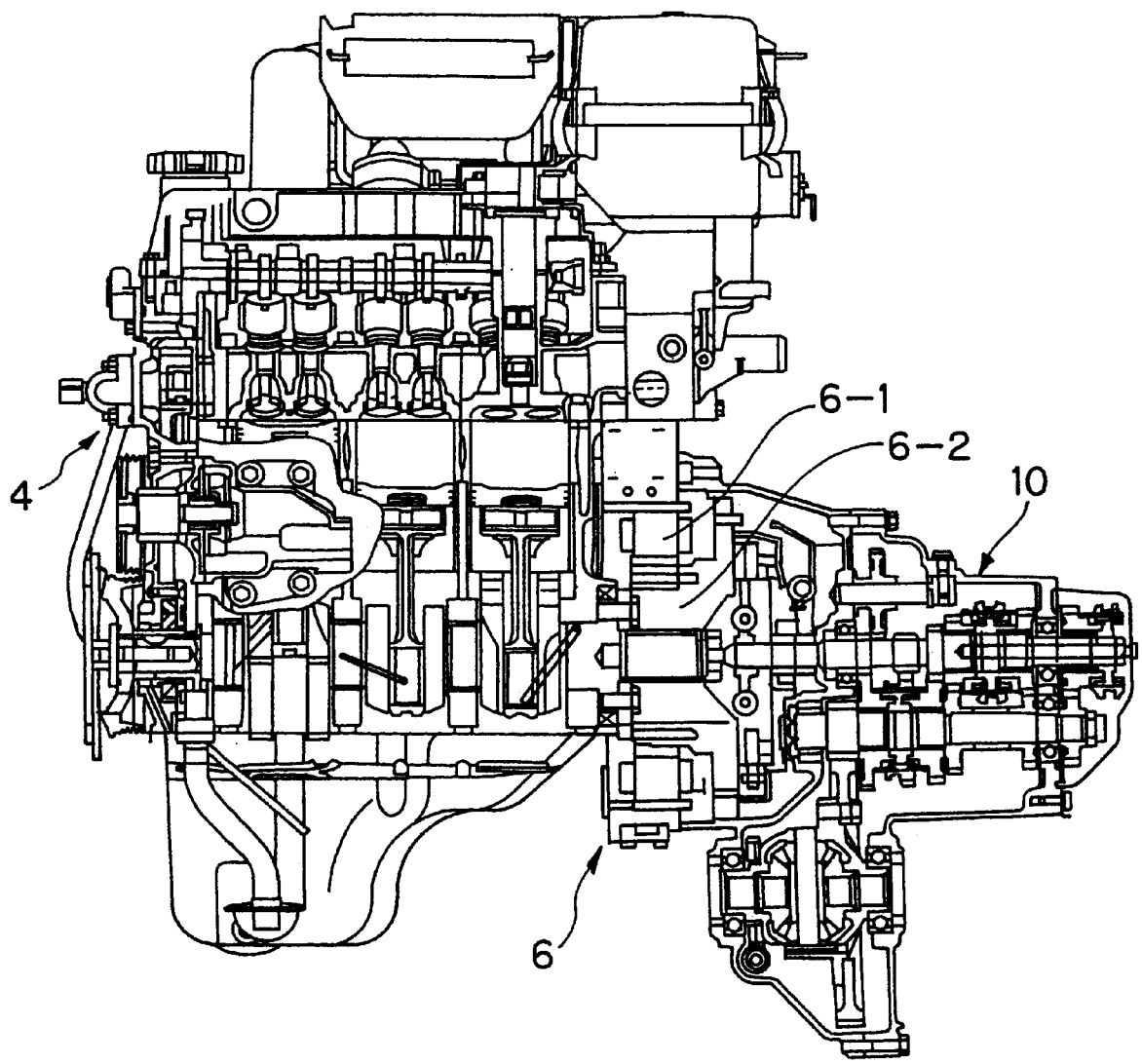
FIG. 2 is a schematic cross-sectional view of an engine.

The motor 6, as shown in FIG. 2, is shown positioned between the engine 4 and the transmission 10. In addition, the motor 6 includes a stator coil 6-1 and a rotor 6-2 such as a flywheel.

The vehicle-propulsion system 2 includes, as a controller 18, engine control means 20 and motor control means 22. The engine control means 20 controls a running state of the engine 4, while the motor control means 22 controls both driving and power-generating states of the motor 6.

The engine 4 is connected to the engine control means 20 through an engine-controlling signal line 24. "Line" is used herein to describe any electrical signal conduit. The engine control means 20 is linked to a sub-battery 28 through an engine control means-dedicated power line 26. The sub-battery 28 is coupled to the alternator 12 through a sub-battery-charging power line 30. The sub-battery 28 is a conventional 12 volt vehicle battery.

The motor 6 is connected to the motor control means 22 through a motor-controlling signal line 32. The motor control means 22 is linked to the sub-battery 28 through a motor control means-dedicated sub-power line 34 and the power line 26. The motor control means 22 is also coupled to a main battery 38 through a motor control means-dedicated main power line 36. The main battery 38 supplies driving electric power to the motor 6 and is charged by generated electric power from the motor 6.

Figure 6:
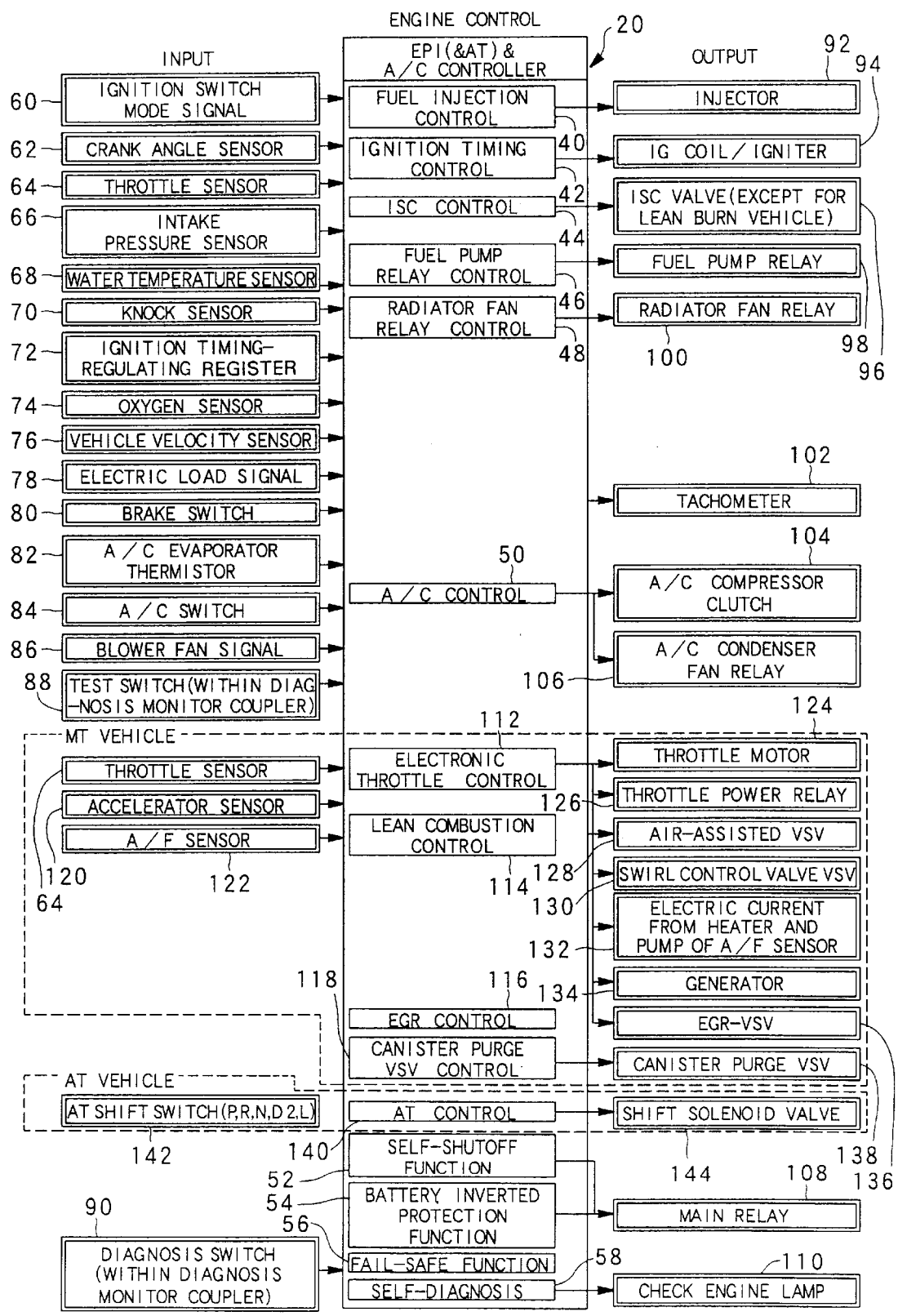
FIG. 6 is a schematic block diagram showing a structure of an engine controller.

As illustrated in FIG. 6, the engine control means 20 includes: a fuel injection control section 40; an ignition timing control section 42; an idle speed control (ISC) section 44; a fuel pump relay control section 46; a radiator fan relay control section 48; an air-conditioner (A/C) control section 50; a self-shutoff function section 52; a sub-battery inverted polarity protection function section 54; a fail-safe function section 56; and a self-diagnosis section 58.

The engine control means 20 is connected at the input side to: an ignition switch 60; a crank angle sensor 62; a throttle sensor 64; an intake pressure sensor 66; a water temperature sensor 68; an engine knock sensor 70; an ignition timing-regulating register 72; an oxygen sensor 74; a vehicle velocity sensor 76; an electric load sensor 78; a brake switch 80; an A/C evaporator thermistor 82; an A/C switch 84; a blower fan 86; a test switch 88; and a diagnosis switch 90.

The engine control means 20 is linked at the output side to: an injector 92; an ignition coil/igniter 94; an ISC valve 96; a fuel pump relay 98; a radiator fan relay 100; a tachometer 102; an A/C compressor clutch 104; an A/C condenser fan relay 106; a main relay 108; and, a check engine lamp 110.

When the transmission 10 is of a manually-operated type, then the engine control means 20 further includes the following as enclosed by a dashed line; an electronic throttle control section 112; a lean combustion control section 114; an EGR control section 116; and a canister purge valve control section 118. In this case, the engine control means 20 is connected at the input side to an accelerator sensor 120 and an air/fuel (A/F) sensor 122 as well as the throttle sensor 64. In addition, the engine control means 2Q is linked at the output side to: a throttle motor 124; a throttle power relay 126; an air-assisted valve 128; a swirl control valve 130; a heater and pump 132 of the A/F sensor 122; a generator 134; an EGR valve 136; and a canister purge valve 138. Valves 128, 136 and 138 are vacuum switch valves (VSV).

Alternatively, when the transmission 10 is of an automatically operated type (AT), then the engine control means 20 further includes an AT control section 140. In this case, the engine control means 20 is connected at the input side to an AT shift switch 142, while being linked at the output side to a shift solenoid valve 144.

The engine control means 20 drives the injector 92 and the ignition coil/igniter 94 in response to signals from the crank angle sensor 62 and the throttle sensor 64, thereby controlling a running state of the engine 4 such as fuel injection quantity and ignition timing.

Figure 7:
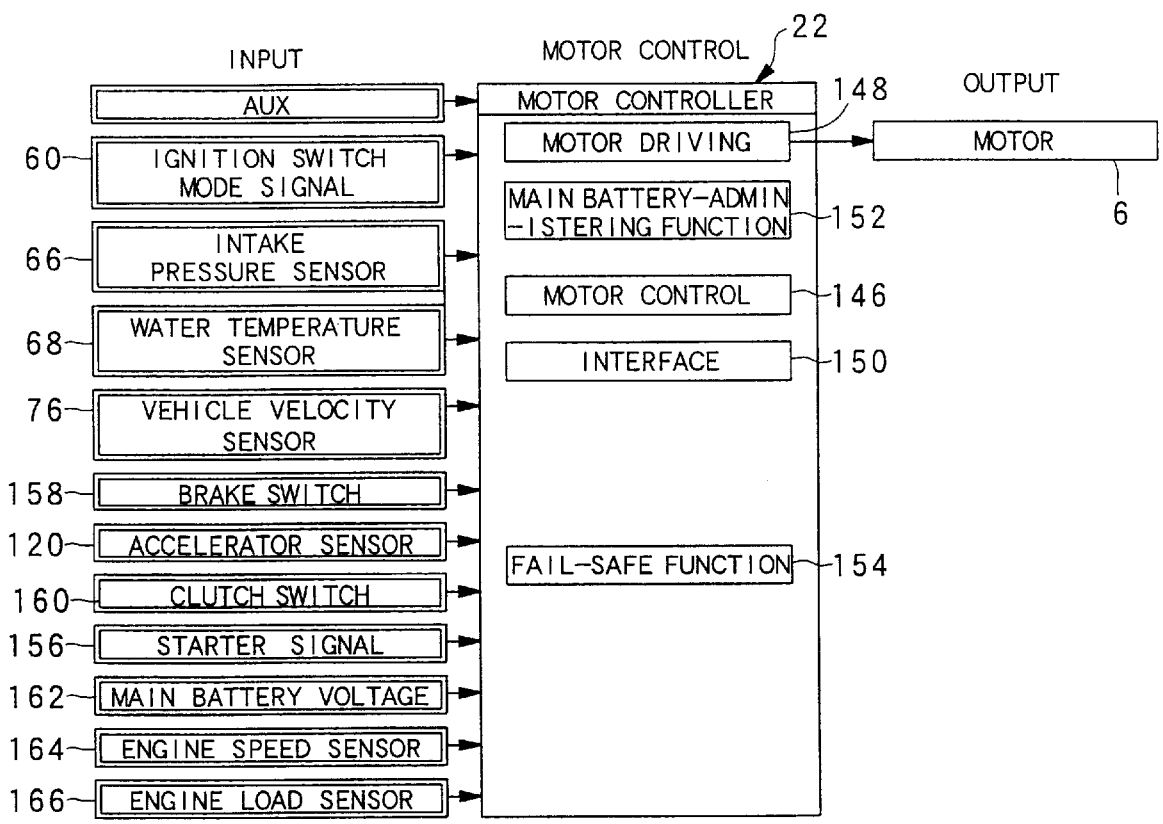
FIG. 7 is a schematic block diagram showing a structure of a motor controller.

The motor control means 22, as shown in FIG. 7, includes a motor control section 146, a motor-driving section 148, an input/output-processing section (interface) 150, a main battery mode-administering section 152, and a fail-safe section 154.

The motor control means 22 is connected at the input side to a starter switch 156, a brake switch 158, a clutch switch 160, a main battery voltage detector 162, an engine rotational speed-detecting means or an engine rotational speed sensor 164, and an engine load-detecting means or an engine load sensor 166, as well as the ignition switch 60, the intake pressure sensor 66, the water (coolant) temperature sensor 68, the vehicle velocity sensor 76, and the accelerator sensor 120. The engine rotational speed sensor 164 and the crank angle sensor 62 are the same element, but in explanation of each constitution, they are explained with different names. They are usually a unified element, but need not be. The motor control means 22 is linked at the output side to the motor 6.

The controller 18 of the vehicle-propulsion system 2 includes both the engine control means 20 and the motor control means 22. The engine control means 20 controls an operating state of the engine 4, while the motor control means 22 controls both driving and power-generating states of the motor 6. The motor control means 22 exchanges no data with the engine control means 20. More specifically, the motor control means 22 is independent of control over the engine 4 executed by the engine control means 20, and thus independently controls and determines the driving and power-generating states of the motor 6.

The motor control means 22, as shown in FIG. 9, is set into a stopping control mode or state, or a traveling control mode or state as control modes that are based on a running state of the vehicle. In addition, the motor control means 22 is at first put into a drive/power generation-prohibiting control mode when switching over between the stopping control mode and the traveling control mode. In this way, the motor control means 22 executes control over the motor 6. The drive/generating-prohibiting control mode prohibits both driving and power generation of the motor 6.

The motor control means 22 receives a main battery voltage signal from the main battery voltage detector 162. The detector 162 detects a main battery voltage of the main battery 38. The battery 38 supplies driving electric power to the motor 6 or is charged by generated electric power from the motor 6. Further, the motor control means 22 has control over the main battery mode-administering section 152 in such a manner that the administering section 152 governs a main battery mode according to the main battery voltage.

The stopping control mode of the motor control means 22, as shown in FIG. 9, may be set into an idling power generation control mode or state, a starting drive control mode or state, a start-up drive control mode or state, and an idle-stabilized drive control mode or state. When in the idling power generation control mode, the motor control means 22 assumes control over the motor 6 so as to permit the motor 6 to generate power and then charge the main battery 38 therewith. When in the starting vehicle motion drive control mode, the motor control means 22 assumes control over the motor 6 so as to drive the motor 6 and then assists in starting the vehicle. In the start-up drive control mode, the motor control means 22 provides control over the motor 6 so as to drive the motor 6 and then assists in starting up the engine 4. In the idle-stabilized drive control mode, the motor control means 22 provides control over the motor 6 so as to drive the motor 6 and stabilize idling of the engine 4.

The traveling control or vehicle running mode of the motor control means 22, as shown in FIG. 9, may be set into a drive/power generation-permitting control mode or state, a drive-prohibiting control mode or state, or a drive/power generation-prohibiting control mode or state. In the drive/power generation-permitting control mode, the motor control means 22 provides control over the motor 6 so as to permit either of driving the motor or power generation charging the main battery 38. In the drive-prohibiting control mode, the motor control means 22 executes control over the motor 6 so as to prohibit the driving of the motor 6, but to permit the motor 6 to generate power. In the drive/power generation-prohibiting control mode, the motor control means 22 executes control over the motor 6 so as to prohibit both the driving and power generation of the motor 6.

The motor control means 22 switches over between the above-described drive/power generation-permitting control mode and drive-prohibiting control mode according to the main battery voltage of the main battery 38 governed by the main battery mode-administering section 152 of the motor control means 22.

Figure 8:
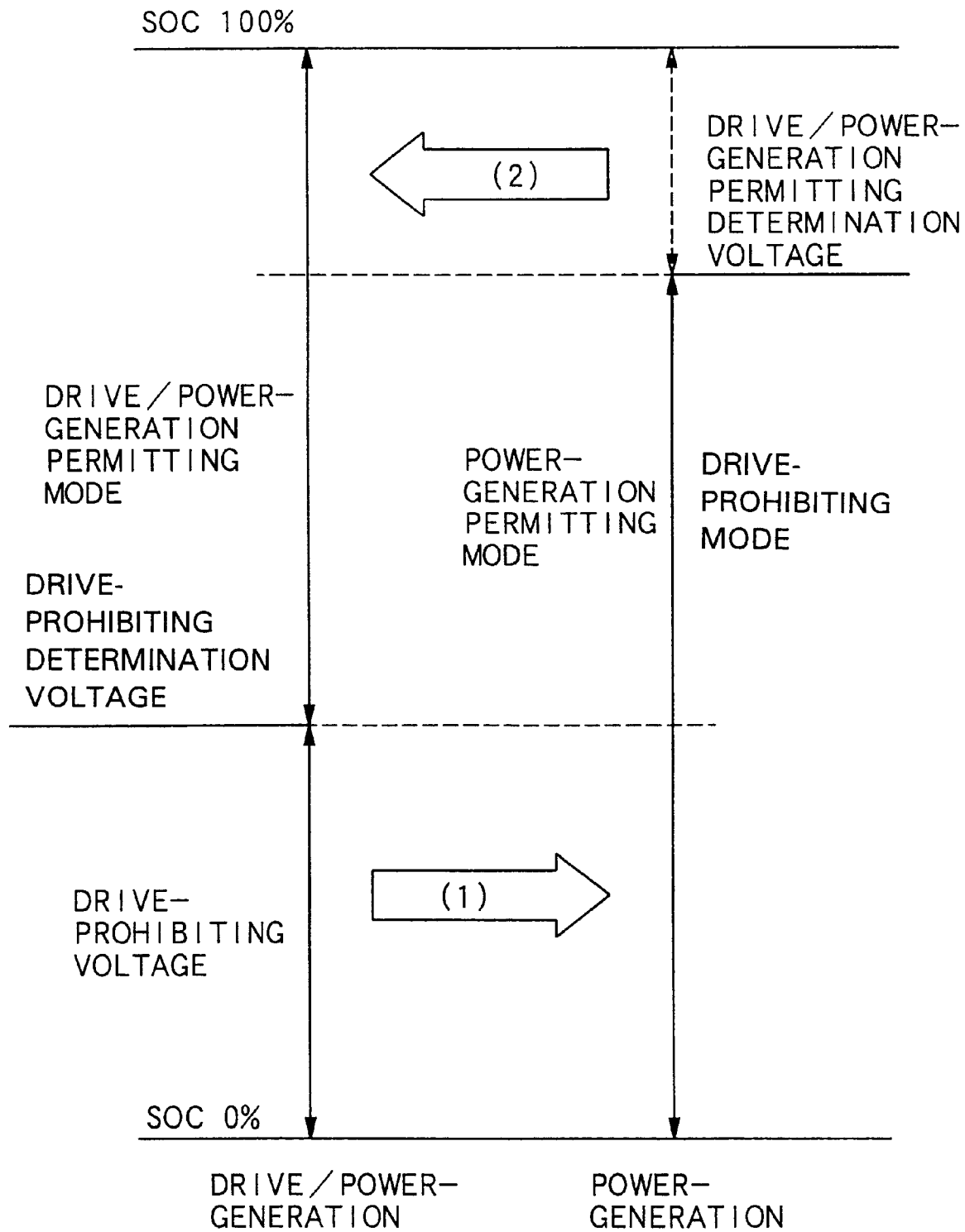
FIG. 8 is a schematic diagram showing a battery control mode.

More specifically, as shown in FIG. 8, when the main battery voltage is charged at 100% state of charge (SOC), then the motor control means 22 is in the drive/power generation-permitting control mode, and assumes control over the motor 6 so as to permit either the driving or power generation of the motor 6. However, when the main battery voltage falls below a lower limit or a drive-prohibiting determination voltage, then the motor control means 22 is put into the drive-prohibiting control mode, and the motor control means allows only power generation driving until the main battery voltage recovers beyond the arbitrary voltage.

Therefore, in the drive-prohibiting control mode, as shown in FIG. 8, the motor control means 22 gains control over the motor 6 so as to prohibit the driving of the motor 6, but to permit the motor 6 to generate power until the main battery voltage reaches a drive/power generation-permitting determination voltage. When the main battery voltage exceeds the drive/power generation-permitting determination voltage, after the main battery voltage recovers from the power generation driving, then the motor control means 22 is returned again to the drive/power generation-permitting control mode. In this mode, the motor control means 22 effects control over the motor 6 so as to permit both the driving and power generation of the motor 6.

Figure 10:
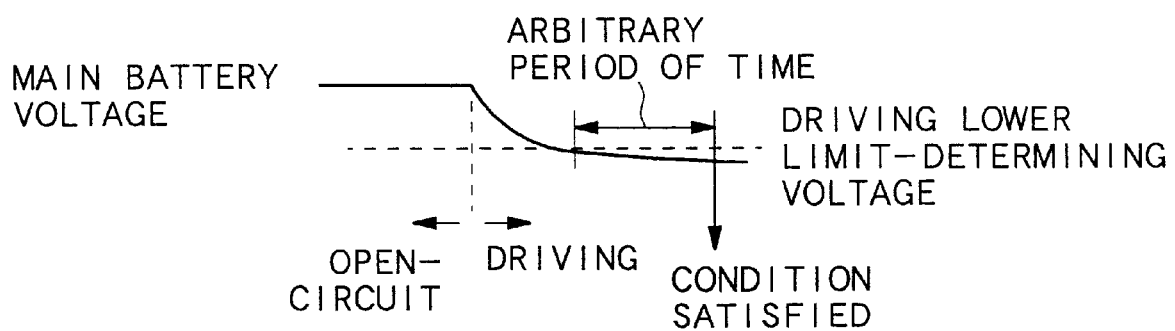
FIG. 10 is a time-chart showing when a low-limit main battery voltage at driving is higher than a main battery voltage at driving.
Figures 11, 12, 13:
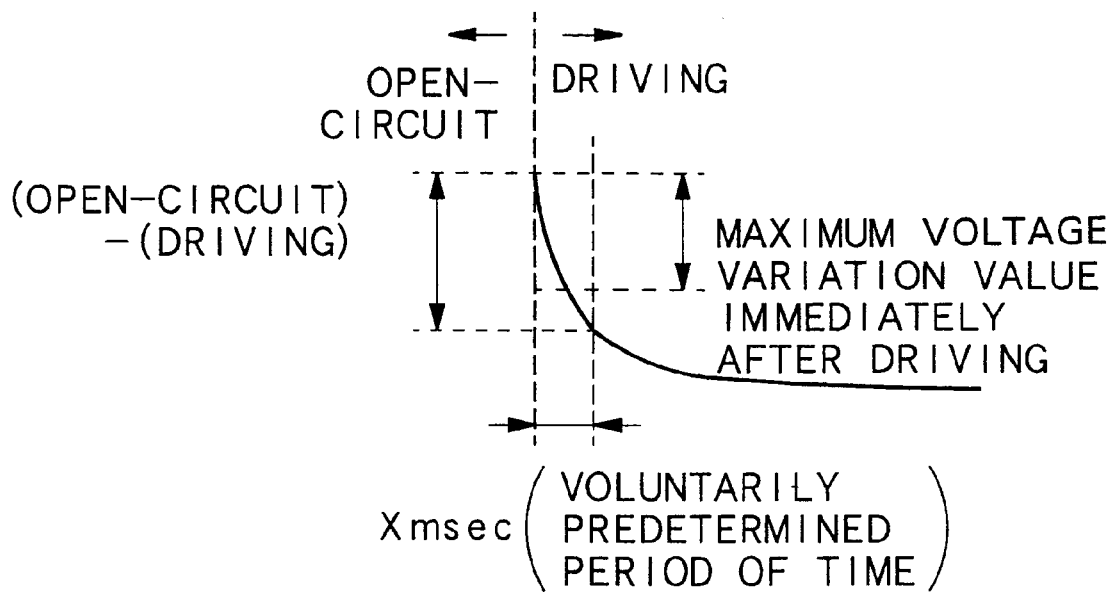
FIG. 11 is a map of a relation between driving torque and motor speed.
FIG. 12 is a time-chart showing when a maximum voltage variation value immediately after driving is lower than a main battery open-circuit voltage minus a driving voltage when X ms elapses after a motor starts its driving.
FIG. 13 is a map of a relation between driving torque and motor speed.

The transition from the drive/power generation-permitting control mode to the drive-prohibiting control mode by the above-mentioned main battery voltage control is made when any one of the following transitional conditions is satisfied:

(1) A main battery open-circuit voltage continues to be less than the drive-prohibiting determination voltage (a voluntary and/or predetermined set value) for an arbitrary period of time;

(2) A driving main battery voltage continues to be less than a driving lower limit-determining voltage (a voluntary and/or predetermined set value for each driving torque) for an arbitrary period of time;
   As shown in FIG. 10, it is required that a driving main battery voltage is less than a driving lower limit-determining voltage for an arbitrary or predetermined period of time until a predetermined condition is concluded.
   As shown in FIG. 11, a determining voltage is obtained from a map which consists of a driving torque and a motor speed.

(3) A value obtained from the main battery open-circuit voltage minus a driving voltage is greater than a maximum voltage variation value immediately after driving (a voluntary set value for each driving torque) when X ms (a voluntarily predetermined period of time) elapses after the motor 6 starts its driving;
   As shown in FIG. 12, it is required that a value obtained from the main battery open-circuit voltage minus a driving voltage is greater than a maximum voltage variation value immediately after driving when X ms (a voluntarily predetermined period of time) elapses after the motor 6 starts its driving.
   As shown in FIG. 13, a maximum voltage variation value is obtained from a map which consists of a driving torque and a motor speed.

(4) The main battery open-circuit voltage minus the driving voltage is greater than a driving maximum voltage drop value (a voluntarily set value for each driving torque) for a voluntarily predetermined period of time; and
   As shown in FIG. 14, it is required that the main battery open-circuit voltage minus the driving voltage is greater than a driving maximum voltage drop value for an arbitrary period of time until a predetermined condition is concluded.
   As shown in FIG. 15, a driving maximum voltage drop value is obtained from a map which consists of a driving torque and a motor speed.

(5) The motor 6 is caused to stop after an arbitrary period of time elapses after the driving of the motor 6 starts, and an open-circuit voltage of the main battery is then checked.

In addition, when the above No. (5) condition is unsatisfied after checking the open-circuit voltage of the main battery, and as determined by the above No. (1) condition from the drive/power generation-permitting control mode to the drive-prohibiting control mode, then the motor 6 resumes its driving state to assist in propelling the vehicle.

Another transition from the drive-prohibiting control mode to the drive/power generation-permitting control mode is made when any one of the following transitional conditions is met:

(1) The main battery open voltage continues to be greater than the drive/power generation-permitting determination voltage (a voluntarily set value) over an arbitrary period of time;

(2) A power-generating main battery voltage continues to be greater than a power-generating upper limit-determining voltage (a voluntarily set value for each power-generating torque) for an arbitrary period of time;
   As shown in FIG. 16, it is required that a power-generating main battery voltage is greater than a power-generating upper limit-determining voltage for an arbitrary period of time until a predetermined condition is concluded or satisfied.
   As shown in FIG. 17, a power-generating upper limit-determining voltage is obtained from a map which consists of a power-generating torque and a motor speed.

(3) The motor 6 is caused to stop generating power when an arbitrary period of time elapses after the motor 6 starts generating power, and then the main battery open-circuit voltage is checked.
   In addition, when the above No. (5) condition is unsatisfied after checking the main battery open-circuit voltage, and after a determination by the above No. (1) condition from the drive-prohibiting control mode to the drive/power generation-permitting control mode, then power generation is permitted again.

In-addition, when a determination as to the above transitional condition No. (3) from the drive-prohibiting control mode to the drive/power generation-permitting control mode is terminated, then the motor control means 22 is put back into the control mode that was operative before such a determination was made, regardless of whether or not the above transitional condition No. (3) was met. Then, the motor control means 22 maintains such control. In addition, the time when the motor control means 22 is returned to the aforesaid control mode is newly defined as a power generation-starting time.

Moreover, in case of an idling mode of the engine 4, when an engine rotational speed output as a detection signal from an engine rotational speed-detecting means or an engine rotational speed sensor 164 varies from a predetermined engine rotational speed set beforehand, then the engine rotational speed is varied by changing an operating mode of the motor 6, and the control means 18 controls so as to return the engine rotational speed to the predetermined engine rotational speed.

Therefore, in case of the idling mode of the engine 4, when the engine rotational speed "Ne" is higher than the predetermined value set beforehand, then the control means 18 controls so as to reduce the engine rotational speed "Ne" by setting the motor 6 in a power generation running mode, so as to return the engine rotational speed "Ne" to the predetermined value.

In addition, in case of the idling mode of the engine 4, when the engine rotational speed "Ne" is lower than the predetermined value set beforehand, then the control means 18 controls the motor 6 so as to increase or raise the engine rotational speed "Ne" after the motor 6 is set in an operation running mode, so as to return the engine rotational speed "Ne" to the predetermined value.

And here, a function added to the control means 18 acts only when an idle switch (defined as "id sw") switches over to an "ON" state at an idling determination, and when determined to be an idling state, at a vehicle velocity of nearly zero or a neutral position.

Furthermore, when the engine rotational speed "Ne" is lower than the predetermined value set beforehand, then the above-mentioned control means 18 controls so as to increase the engine rotational speed "Ne" after the motor 6 is set in an operation running mode, and when the engine rotational speed moreover descends or when the engine rotational speed does not rise, then the control means 18 controls the operation running mode of the motor 6.

In a word, when an engine loses the ability to maintain an idling state, by a no fuel condition or obstacles such as electrical system trouble, mechanical trouble and a sudden clutch meet, then the control means functions to stop the motor from driving and maintaining an idling mode out of consideration for such a situation.

Moreover, the motor control means 22 includes the added function whereby respective detection signals from the vehicle velocity detection sensor 76 and the engine rotational speed detection sensor 164 allow determination of the gear position.

More specifically, after the motor control means 22 receives detection signals from the vehicle velocity detection sensor 76 and the engine rotational speed detection sensor 164, a ratio of the vehicle velocity and the engine rotational speed for example, dividing the vehicle velocity "Vs" by the engine rotational speed "Ne" (an inversion of vehicle velocity and engine rotational speed is also possible) would yield a value whereby the gear position could be determined.

And the relation is expressed in the next expression.
Vs/Ne(or Ne/Vs)=S

Figure 18:
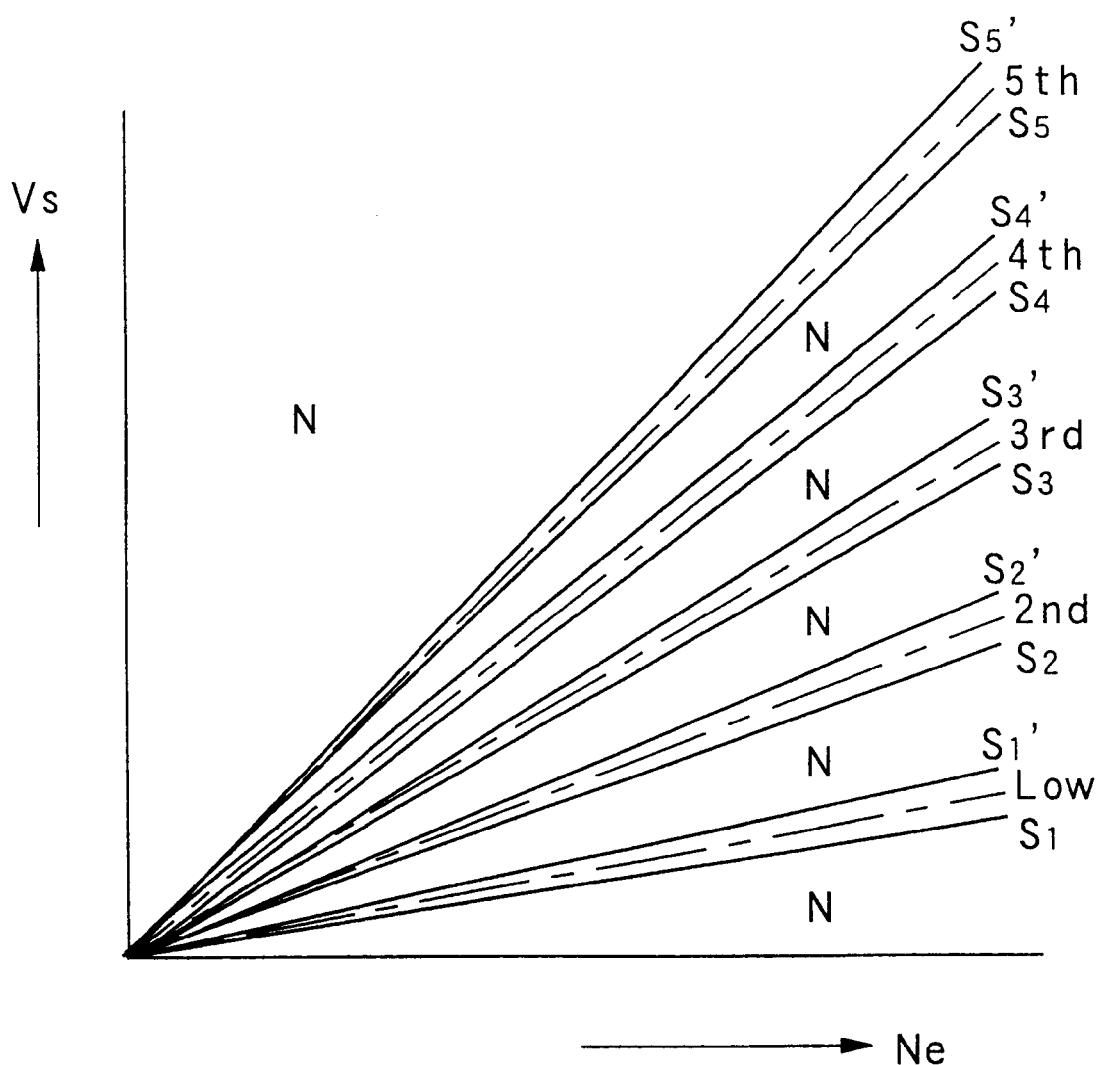
FIG. 18 is a diagram explaining a clutch "CUT" flag for a neutral determination.

As shown in FIG. 18, the ranges of each gear position are as follows.

S1 to S1': "Low"
S2 to S2': "$2^{nd}$"
S3 to S3': "$3^{rd}$"
S4 to S4': "$4^{th}$"
S5 to S5': "$5^{th}$"

To add to the conditions for determination of gear position, when the vehicle is not moving and the clutch pedal is not being pressed down the determination will be neutral; when the vehicle is not moving, and the clutch is being pressed down the determination will be low ("Low") gear.

Also, at times when the vehicle is in a traveling or driven mode and the clutch pedal is pressed down in order to shift gears and the relation between the vehicle velocity and the engine rotational speed is not in a fixed relation, then the previously determined gear, that is, the last gear position to be recognized, will continue to be used. When the shifting operation is complete and a new gear position has been determined, a new gear position will be selected and used. Moreover, conditions when the relation between the vehicle velocity and the engine rotational speed is not fixed will include the condition when the tires spin freely causing sharp fluctuations in the relation between the vehicle velocity and the engine rotational speed.

To add the explanation of the vehicle velocity sensor 76, in addition to the vehicle velocity being detected by the respective revolution sensors attached to the driven wheels and the free wheels, detection is also possible by a relative speed sensor (also known as a ground sensor) attached to the vehicle body. These sensors may serve as substitutes for the vehicle velocity sensor 76.

To add to the determination of neutral position, the neutral determination is done by the following conditions from (1) to (4), to obtain a neutral determination.

(1) vehicle velocity=0 and engine rotation speed>0
(2) vehicle velocity>0 and S<S1
   or S1'<S<S2
   or S2'<S<S3
   or S3'<S<S4
   or S4'<S<S5
   or S5'<S
(3) vehicle velocity>0 and clutch SW1 ("clutch switch 1"): "ON"and clutch SW2: "OFF" (the position cut off completely, clutch disengaged)
(4) vehicle velocity>0 and clutch SW1: "ON" and clutch SW2: "OFF"

Figure 19:
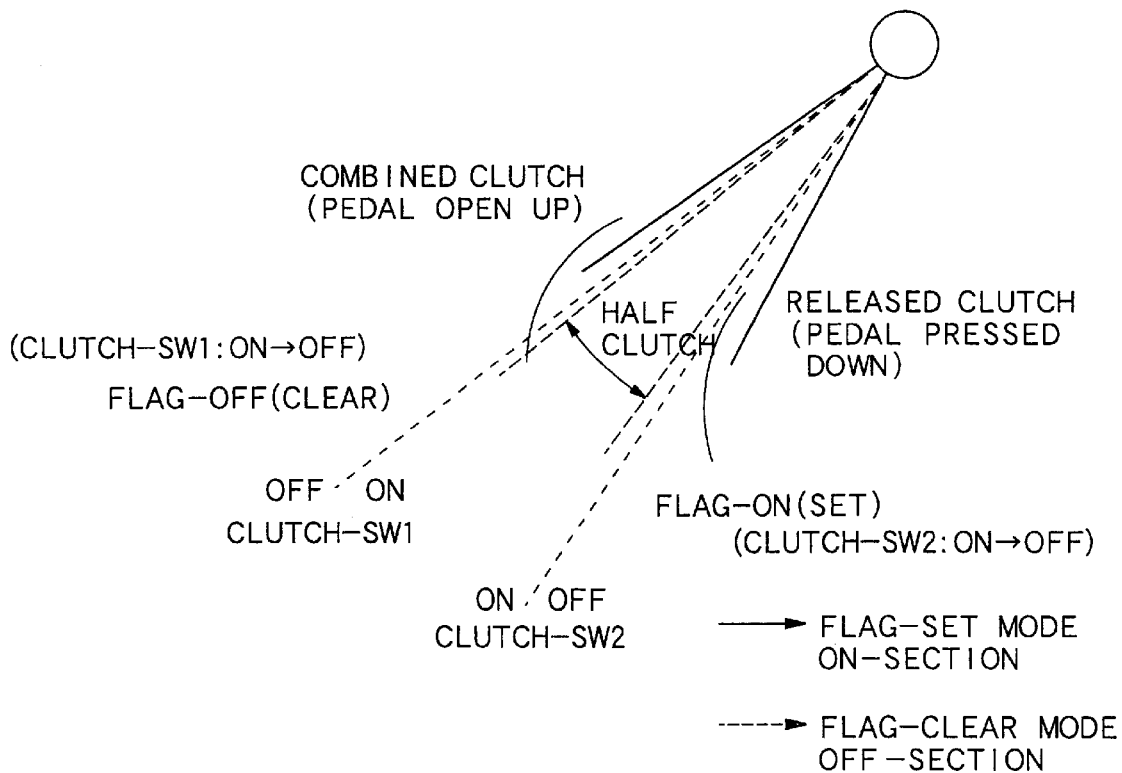
FIG. 19 is a schematic diagram illustrating a switchover condition and a removing condition in a start assist.

Still, a clutch "CUT" flag is set for a switchover of clutch SW1 and clutch SW2. As shown in FIG. 19, a condition of clutch "CUT" flag is as follows.

Set "ON" condition: clutch SW2 switches over from "ON" to "OFF".
Set "OFF" condition: clutch SW1 switches over from "ON" to "OFF".

The clutch "CUT" flag, as shown in FIG. 20, is used for switching over a start assisting condition.

Figure 21:
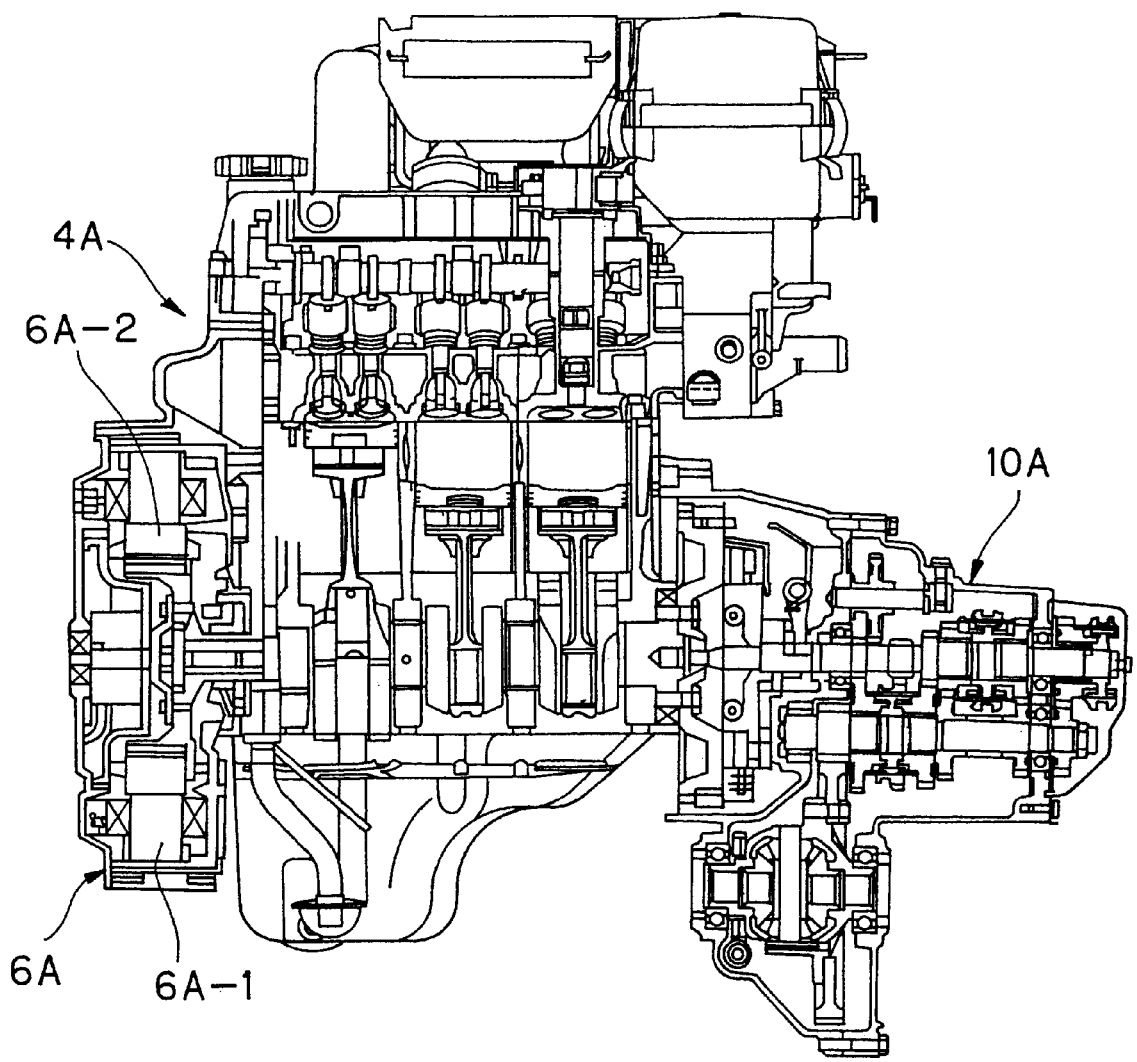
FIG. 21 is a schematic cross-sectional view of an engine, showing a first structure.
Figure 22:
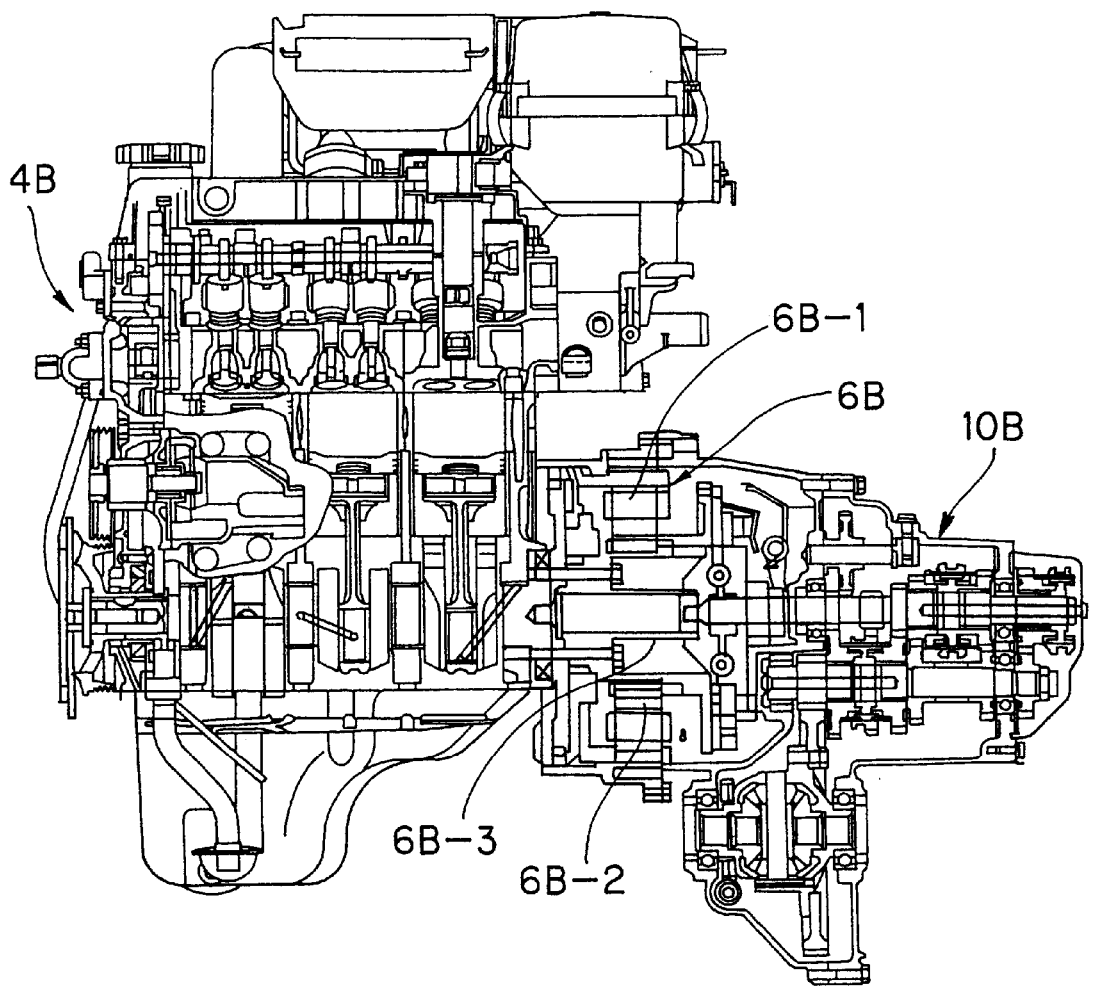
FIG. 22 is a schematic cross-sectional view of an engine, showing a second structure.

In the present embodiment, the engine 4 is connected directly to the motor 6 that is positioned between the engine 4 and the manually operated transmission 10 as shown in FIG. 2. However, as long as motor 6 is communicated to the engine 4, a different position is possible, for example, a motor 6A (FIG. 21) may be disposed at an opposite end of the engine 4A relative to a position where the transmission 10A is connected to the engine 4A. In this case, the motor 6A includes a stator coil 6A-1 and a rotor 6A-2. The rotor 6A-2 is connected to the crank shaft of engine 4A. In addition, as shown in FIG. 22, when the engine 4B is connected directly to the motor 6B that is positioned between the engine 4B and the manually operated transmission 10B, then a starter coil 6B-1 and a rotor 6B-2 may be disposed in a dent part in a circumference of a flywheel 6B-3 which consists of more than one component.

In this connection, reference numerals 168 and 170 denote a cooling sub-radiator for the motor 6 and a rotor-driven water pump, respectively. The water pump 170 is driven under the control of the motor control means 22, thereby supplying the motor 6 with cooling water.

Operation of the embodiment will now be described with reference to control flowcharts in FIGS. 3 and 4 for use in the controller.

As shown in FIG. 5, the motor control means 22 is set into the stopping control mode and the traveling control mode as a select control mode that is based on an operating state of a vehicle.

Figure 3:
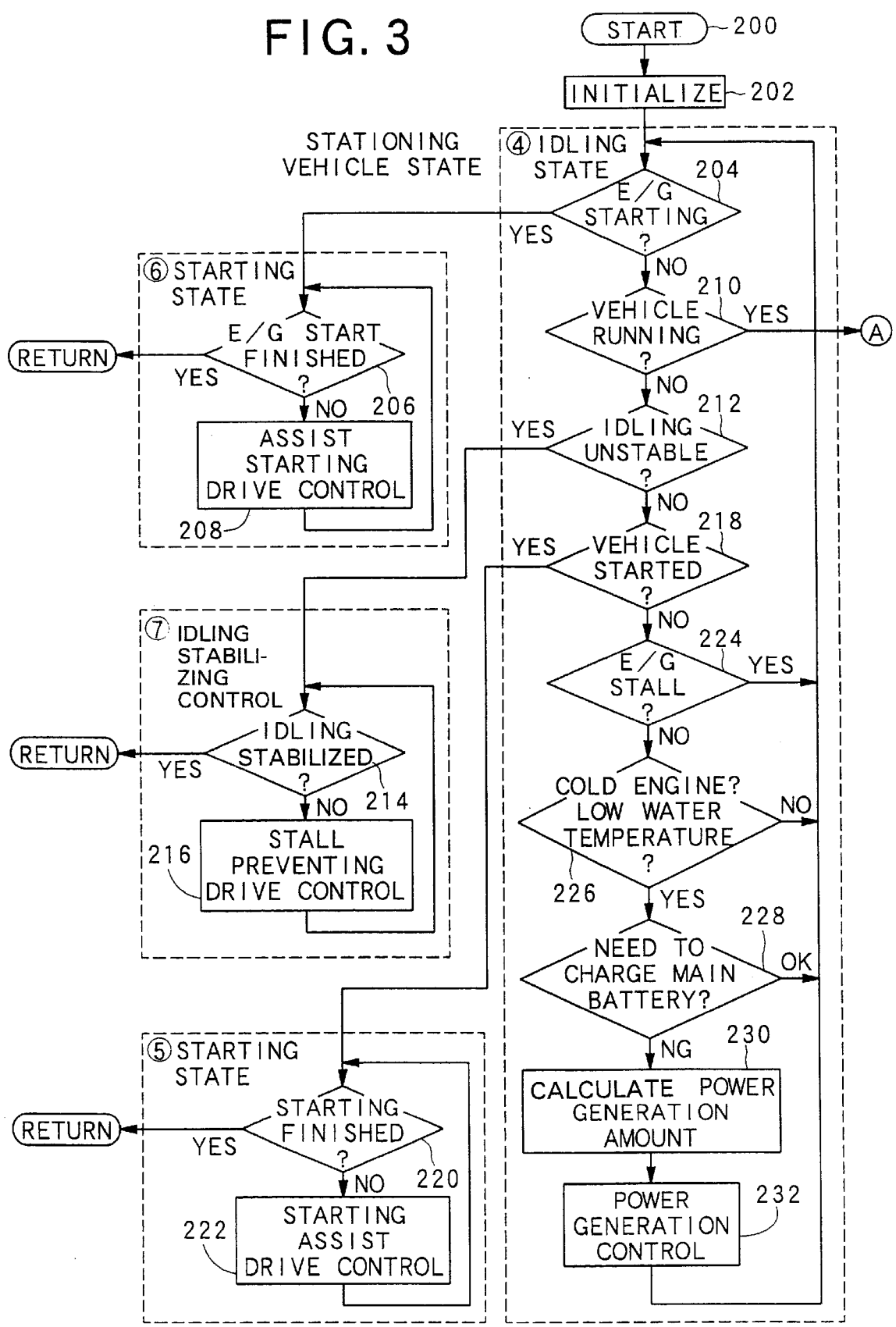
FIG. 3 is a control flowchart in a stopping control mode for use in a controller.

Referring now to FIG. 3, when the motor control means 22 is in the stopping control mode, it starts control at step 200, then the program is initialized at step 202. Then, a determination is made at step 204 as to whether the engine 4 is starting up.

When the determination in step 204 results in "YES", then it is determined at step 206 whether the start-up of the engine 4 has been completed. When the determination in step 206 is "YES", then the routine is returned to previous step 204. However, when the answer to the determination in step 206 is "NO", then the motor control means 22 is put into a start-up drive control mode. The motor control means 22 then provides control over the motor 6 at step 208 so as to drive the motor 6 and assist in starting the engine 4. Then, the routine is returned to previous step 206.

When the determination in previous step 204 is "NO", then a determination is made at step 210 as to whether the vehicle is traveling. When the answer to the determination in step 210 is "YES", then the motor control means 22 is shifted to the traveling control mode as hereinafter described. When the determination in step 210 is "NO", then it is determined at step 212 whether idling is unstable.

When the determination in step 212 results in "YES", then it is determined at step 214 whether such idling has been stabilized. When the determination in step 214 is "YES", then the routine is returned to previous step 212. However, when the determination in step 214 results in "NO", then the motor control means 22 is put into an idle-stabilized drive control mode. The motor control means 22 then executes control over the motor 6 at step 216 so as to drive the motor 6 and stabilize idling of the engine 4. Then, the routine is returned to previous step 214.

When the determination in previous step 212 results in "NO", then it is determined at step 218 whether the vehicle has started moving. When the determination in step 218 is "YES", then a further determination is made at step 220 as to whether such vehicle motion has started. When the determination in step 220 is "YES", then the routine is returned to previous step 218. However when the determination in step 220 results in "NO", then the motor control means 22 is put into a starting motion drive control mode. The motor control means 22 then effects control over the motor 6 at step 222 so as to drive the motor 6 and assist in starting motion of the vehicle. Then, the routine is returned to previous step 220.

When the determination in previous step 218 is "NO", then it is determined at step 224 whether the engine 4 stalled. When the determination in step 224 is "YES", then the routine is returned to previous step 204. When the determination in step 224 is "NO", then a determination is made at step 226 as to whether the engine 4 is in a cold state and water temperature is low.

When the answer to the determination in step 226 is "NO", then the routine is returned to previous step 204. However, when the determination in step 226 results in "YES", then it is determined at step 228 whether the main battery 38 needs to be charged.

When the determination in step 228 results in "OK" because the main battery 38 need not be charged, then the routine is returned to previous step 204. However, when the determination in step 228 is "NG" because the main battery 38 must be charged, then a quantity of generated electric power is calculated at step 230. Further, the motor 6 is controlled at step 232 so as to generate power. Then, the routine is returned to previous step 204.

Figure 4:
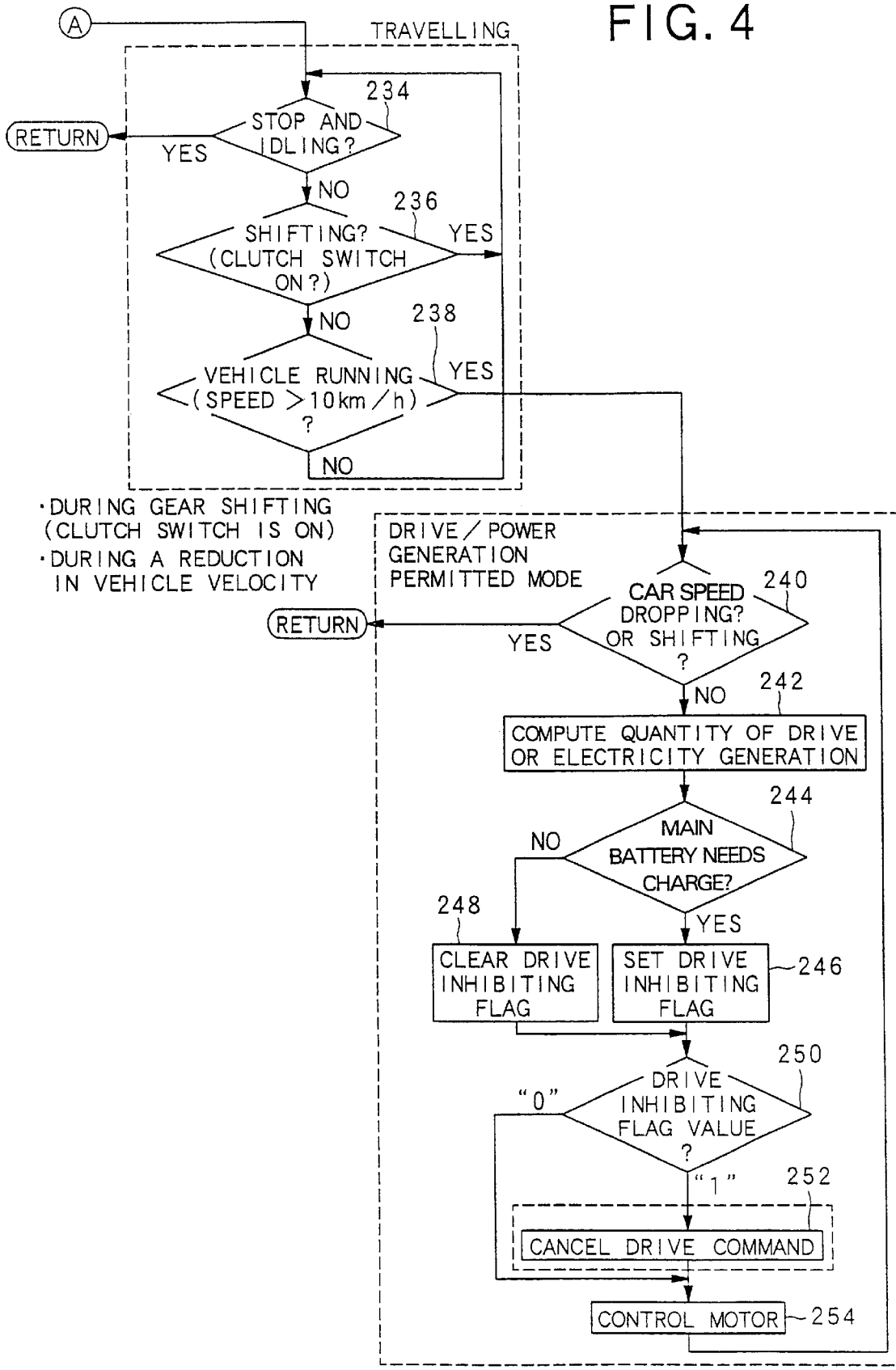
FIG. 4 is a control flowchart in a traveling control mode for use in the controller.
Figure 5:
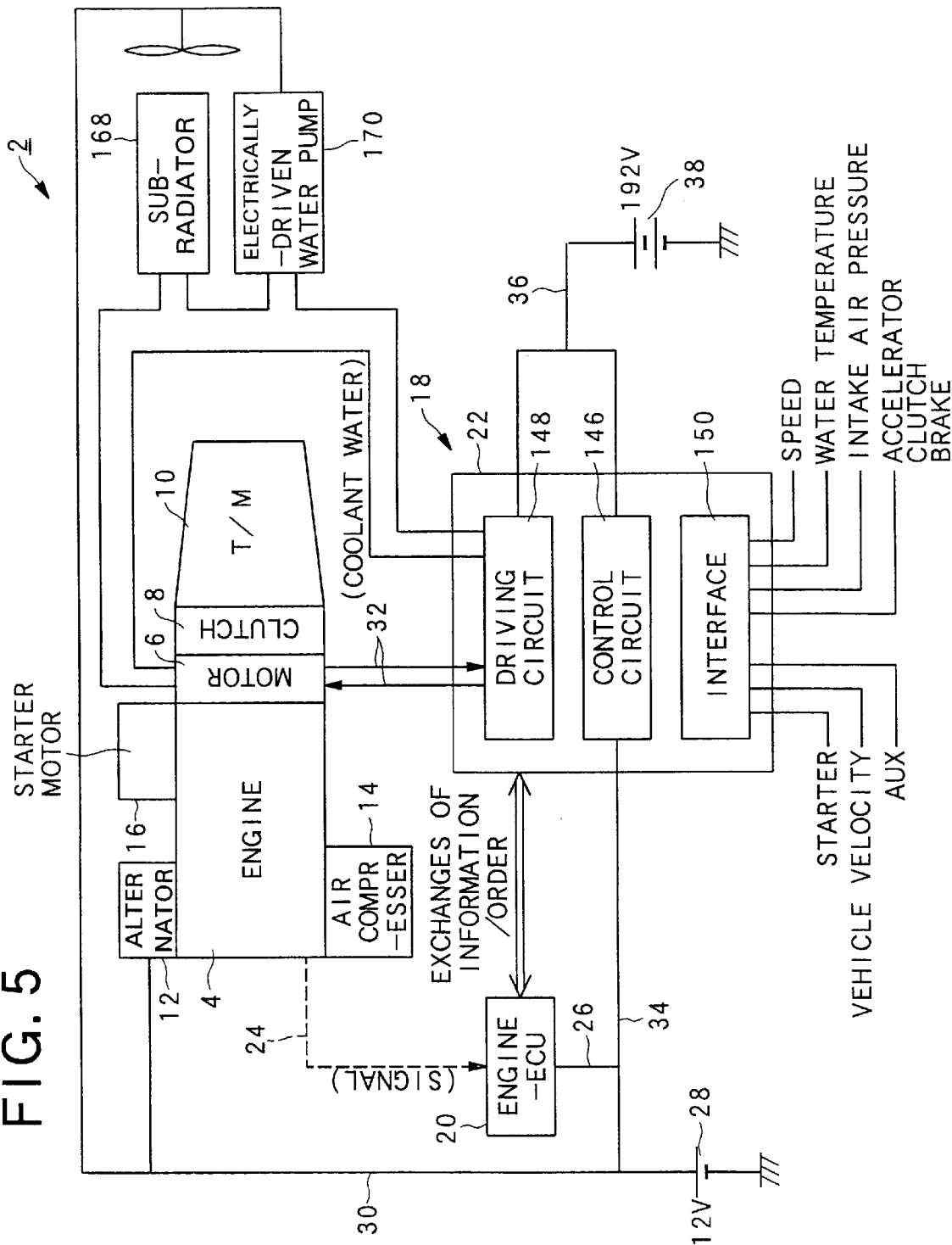
FIG. 5 is a block diagram illustrating a system of the controller for a vehicle-propulsion system.

When the determination step 210 is "YES", because the vehicle is traveling, then the motor control means 22 is at first put into a drive/power generation-prohibiting control mode, and control then shifts to the traveling control mode as illustrated in FIG. 4. In the drive/power generation-prohibiting control mode, a determination is made at step 234 as to whether the vehicle is halted in an idling state.

When the determination in step 234 is "YES", then the routine is returned to previous step 210 in the idling control mode as shown in FIG. 3. When the determination in step 234 is "NO", then it is determined at step 236 whether the clutch switch 160 has been activated (in the course of gear shifting or in a neutral position).

When the determination in step 236 is "YES", then the routine is returned to previous step 234. When the determination in step 236 is "NO", then it is determined at step 238 on the basis of a vehicle velocity signal from the vehicle velocity sensor 76 whether the vehicle is traveling.

When the determination in step 238 is "NO", the routine is returned to previous step 234. However, when the determination in step 238 is "YES", then the motor control means 22 shifts to a drive/power generation-permitting control mode in the traveling control mode. Then, a determination is made at step 240 as to whether vehicle velocity is on the decrease or the clutch switch 160 is "ON" (in the course of gear shifting or in a neutral position).

When the determination in step 240 is "YES", then the routine is returned to previous step 234. When the determination in step 240 results in "NO", then either a driving electrical quantity or a quantity of generated electric power is calculated at step 242, thereby deciding on either a driving order or a power-generating order. It is then determined at step 244 whether the main battery 38 needs to be charged.

When the determination in step 244 is "YES" because the battery 38 needs to be charged, then a "drive-prohibiting" flag is processed at step 246 so as to be set to one value, here a "1". When the determination in step 244 is "NO" because the main battery 38 need not be charged, then the drive-prohibiting flag is processed at step 248 so as to be another value, here cleared to "0".

It is then determined at step 250 whether the drive-prohibiting flag is either "1" or "0". When the answer to the determination in step 250 is "1", then the motor control means 22 is shifted to a drive-prohibiting control mode. When the result from previous step 242 is the driving order, then the driving order of the motor 6 is cancelled at step 252, and only the power-generating order is made effective. When the answer to the determination in step 250 is "0", then the result from previous step 242 is rendered operative. Then, the motor 6 is controlled at step 254 according to either the effective driving order or power-generating order. Thereafter, the routine is returned to previous step 240.

Next, further operation of the embodiment will be described with reference to an engine rotational speed stabilizing control flowchart in FIG. 1.

When the idle-stabilized control program starts at step 300, then a determination is made at step 302 as to whether the engine rotational speed "Ne" exceeds the first engine rotational speed "#Ne1" (Ne>#Ne1). When the determination is "NO", then the routine is returned to step 304. When the answer to the determination in step 302 is "YES", then the routine is advanced to step 306 for determining whether a gear position is neutral.

In step 306 for determining whether the gear position is neutral, when the determination is "NO", then the routine is returned to step 304. When the answer to the determination in step 306 is "YES", then the routine is advanced to step 308 for determining whether the vehicle velocity is nearly zero.

In step 308 for determining whether the vehicle velocity is nearly zero, when the determination is "NO", then the routine is returned to step 304. When the answer to the determination in step 308 is "YES", then a determination is made at step 310 whether the idle switch (id sw) is in "ON" mode. When the determination in step 310 is "NO", then the routine is returned to step 304. When the determination in step 310 is "YES", then a determination is made at step 312 as to whether the engine rotational speed "Ne" exceeds the second engine rotational speed "#Ne2" (Ne>#Ne2).

When the determination in step 312 is "YES", then the routine is returned to a motor power-generating treatment step 314. When the answer to the determination in step 312 is "NO", then the routine is advanced to step 316 for determining whether the engine rotational speed "Ne" exceeds the third engine rotational speed "#Ne3" (Ne>#Ne3).

After the above-mentioned motor power-generating treatment step 314, a determination is made at step 318 as to whether the engine rotational speed "Ne" is less than the fourth engine rotational speed "#Ne4" (Ne<#Ne4). When the determination in step 318 is "NO", then the routine is returned to the previous motor power-generating treatment step 314. When the answer to the determination in step 318 is "YES", then the motor power-generating treatment is stopped step 320. The routine then is advanced to step 322.

In step 316 for determining whether the engine rotational speed "Ne" is less than the third engine rotational speed "#Ne3" (Ne<#Ne3), when the determination in step 316 is "NO", then the routine is returned to step 324. When the answer to the determination in step 316 is "YES", then a motor driving treatment is done, step 326. After the motor driving treatment step 326, a determination is made at step 328 as to whether the motor driving time "t" exceeds an arbitrary time "#t",(t>#t).

When the determination in step 328 is "YES", then the routine is returned to a drive stopping treatment step 334 (later description). When the determination in step 328 is "NO", then a determination is made at step 330 as to whether engine rotational speed "Ne" is less than the fifth engine rotational speed "#Ne5",(Ne<#Ne5).

When the determination in step 330 is "YES", then the routine is returned to a drive stopping treatment step 334 (later description). When the determination in step 330 is "NO", then a determination is made at step 332 as to whether engine rotational speed "Ne" exceeds the sixth engine rotational speed "#Ne6",(Ne>#Ne6).

When the determination in step 332 is "NO", then the routine is returned to motor driving treatment step 326. When the determination in step 332 is "YES", then the routine returns to the drive stopping treatment step 334, and the routine is returned to step 336.

In the case of an idling state of the engine 4, when an engine rotational speed measured by a detection signal from an engine rotational speed detecting means or an engine rotational speed sensor 164 varies from a predetermined engine rotational speed set beforehand, then the control means 18 controls so as to change the engine rotational speed by changing a running state of the motor 6, and the engine rotational speed is returned to the predetermined engine rotational speed. Accordingly, the engine rotational speed in the idling state is converged to the predetermined engine rotational speed, and becomes constant in order to let idling stabilize. As a result, as vibration and sound depending on an unnecessary rise of an engine rotational speed is controlled, the stillness or quietness of the engine is improved, and such characteristic is advantageous in practical use. As a uniform discharge characteristic of exhaust gas may be provided by an engine rotational speed stabilizing control means, a clearance of the exhaust gas is expected, and besides, a simplification of a system is able to be planned.

In addition, in case of the idling state of the engine 4, when the engine rotational speed "Ne" is higher than the predetermined value set beforehand, then the control means 18 controls so as to reduce the engine rotational speed "Ne" after the motor 6 is set in a power generation running mode, and so as to return the engine rotational speed "Ne" to the predetermined value, as a result, as vibration and sound depending on an unnecessary rise of an engine rotational speed or the descent is controlled, the quietness is improved, and the characteristic is advantageous in practical use. As a uniform discharge characteristic of exhaust gas may be provided by an engine rotational speed stabilizing control means, a clearance of the exhaust gas is expected.

Furthermore, in case of the idling mode of the engine 4, when the engine rotational speed "Ne" is lower than the predetermined value set beforehand, then the control means 18 controls so as to raise the engine rotational speed "Ne" after the motor 6 is set in an operation running mode, so as to return the engine rotational speed "Ne" to the predetermined value, as vibration and sound depending on an unnecessary rise of an engine rotational speed or the descent is controlled. The stillness is improved, and the characteristic is advantageous in practical use. And as a uniform discharge characteristic of exhaust gas may be provided by an engine rotational speed stabilizing control means, a clearance of the exhaust gas is expected.

Furthermore, when the engine rotational speed "Ne" is lower than the predetermined value set beforehand, then the above-mentioned control means 18 controls so as to raise the engine rotational speed "Ne" after the motor 6 is set in a running operation, and when the engine rotational speed moreover descends or when the engine rotational speed does not rise, then the control means 18 controls so as to maintain the operation running mode of the motor 6. Furthermore, when the engine rotational speed "Ne" is lower than the predetermined value set beforehand, then the above-mentioned control means 18 controls so as to raise the engine rotational speed "Ne" after the motor 6 is set in an operation running mode. When the engine rotational speed moreover descends or when the engine rotational speed does not rise, then the control means 18 controls to the operation running mode of the motor 6. By the function, when an engine loses the ability to maintain an idling state, due to no fuel or obstacles such as electrical system trouble, mechanical trouble or a sudden clutch meet, then the control means functions to stop motor driving maintaining an idling mode out of consideration for such a situation. Therefore, an unnecessary consumption of an unnecessary electricity energy may be restrained, and such characteristic is advantageous in practical use.

As the control means 18 has only to modify a control program, there is not the anxiety that the constitution or arrangement becomes complicated, and the control means 18 has the practical advantages of a simplified design and construction. As a result, a simplified system is achievable at reduced costs, which is economically advantageous.

The present invention is not limited to the above, but is susceptible to various applications, changes, and modifications.

For example, a function may be added to the control means such that a motor is first used and an engine is used for assisting the motor. In other words, an idling state is detected, and when this idling state becomes longer than needed, then a motor maintains the idling state, and an engine is stopped once. Therefore, a vehicle is made to start with a motor, and then the engine assists for later traveling.

Hence, in an idling state of long time, the control means can control so as to stop the engine. As a result, if an exhaust gas including a harmful ingredient is not drained, a clearance of the exhaust gas is expected, and it is advantageous in practical use that the starting of the vehicle is done swiftly and certainly by using the motor.

Moreover, a function may be added to the control means such that, in an engine and a motor having both a drive function and a power-generating function as the vehicle-propulsion system, the control means in which a role of the motor is different from the engine in use can switch over to a certain mode, for example an economic mode and a clean mode set beforehand.

In other words, such a control means, according to the driving situation of vehicle traveling, can switch over to either the economy mode or the clean mode, namely, the economy mode raising the use ratio of an engine for a motor and getting a big output, and the clean mode raising the use ratio of a motor for an engine and realizing a clearance of exhaust gas, as set forth beforehand respectively.

Then, the control means is disposed with an engine and a motor having both a drive function and a power-generating function as the vehicle-propulsion system. A switch over to various kinds of modes is possible. Therefore, it is advantageous in practical use that a traveling state of a vehicle is expanded because a driving control state is selected voluntarily.

Incidentally, a function may be added to the control means such that the switch over to each above mode is not only done by a manual operation, but an automatic operation.

As amplified in the above description, the present invention provides a motor control apparatus combined with an engine having both driving and power-generation functions, and having a determining means for determining an idling state of the engine, comprising: an engine rotational speed-detecting means for detecting rotational speed of the engine; and, the control means controlling so as to return the engine rotational speed to the predetermined engine rotational speed, varying the engine rotational speed by changing an operating state of the motor, when an engine rotational speed sensed by a detection signal from an engine rotational speed-detecting means varies for a predetermined engine rotational speed set beforehand. In the case of an idling mode of the engine, when an engine rotational speed sensed by a detection signal from an engine rotational speed-detecting means or an engine rotational speed sensor varies for a predetermined engine rotational speed set beforehand, then the engine rotational speed is varied by changing an operating state of the motor, and the control means controls so as to return the engine rotational speed to the predetermined engine rotational speed. Moreover, the engine rotational speed in the idling state is converged to the predetermined engine rotational speed, and becomes constant in order to stabilize idling. As a result, as vibration and sound depending on an unnecessary rise of an engine rotational speed or the descent (decreased) is controlled, the stillness is improved. This characteristic is advantageous in practical use. A uniform discharge characteristic of exhaust gas may be provided by an engine rotational speed stabilized control means, a clearance of the exhaust gas is expected, and a simplification of a system design is able to be executed.

What is claimed is:

1. A motor control apparatus combined with an engine and an electric motor, the motor control apparatus having both driving and power-generation functions, and having a determining device for determining an idling state of the engine, the motor control apparatus comprising an engine rotational speed-detector for detecting an engine rotational speed, a controller for controlling the engine rotational speed at a predetermined engine rotational speed value, the controller varying the engine rotational speed by changing an operating state of the electric motor when the engine rotational speed sensed by a detection signal from the engine rotational speed-detector varies from the predetermined engine rotational speed value for the idling state of the engine, wherein in case of the idling state of the engine, when the engine rotational speed is lower than the predetermined engine rotational speed value, the controller controls so as to increase the engine rotational speed by setting the motor in an operation running state so as to return the engine rotational speed to the predetermined engine rotational speed value, and when the engine rotational speed decreases or when the engine rotational speed does not increase, the controller stops the operation running state of the motor.

2. The motor control apparatus combined with an engine according to claim 1, wherein in the idling state of the engine, when the engine rotational speed is greater than the predetermined rotational speed value, the controller controls so as to reduce the engine rotational speed by setting the motor in a power generation running state, so as to return the engine rotational speed to the predetermined rotational speed value.

3. The motor control apparatus combined with an engine according to claim 1, wherein a no fuel condition causes the decrease in engine rotational speed with the motor in an operation running state.

4. The motor control apparatus combined with an engine according to claim 1, wherein an electrical system failure causes the decrease in engine rotational speed with the motor in an operation running state.

5. The motor control apparatus combined with an engine according to claim 1, wherein a vehicle velocity sensor and the engine rotational speed-detector, in combination, determine a gear position for the vehicle.

6. The motor control apparatus combined with an engine according to claim 5, wherein the engine comprises an internal combustion engine.

7. The motor control apparatus combined with an engine according to claim 1, wherein the engine comprises an internal combustion engine.

8. A vehicle comprising an internal combustion engine and an electric motor, the vehicle including:
   an engine rotation speed sensor for sensing engine rotational speed;

an idle switch sensor for sensing the idling condition of the vehicle;

a determining device for determining that the vehicle is idling in view of outputs from the engine rotation speed sensor and idle switch sensor; and a motor controller for controlling driving and power-generating functions for the electric motor, wherein, when the determining device determines idling of the vehicle and the engine rotational speed is less than a predetermined engine rotational speed value for the idling state of the engine, the motor controller operates the electric motor in a driving mode to increase the engine rotational speed of the engine to the predetermined engine rotational speed value, and wherein, if operating the electric motor in the driving mode does not increase the rotational speed of the engine, the motor controller discontinues the driving mode for the electric motor.

9. The vehicle according to claim 8, the vehicle including:

a vehicle velocity sensor for sensing velocity of the vehicle, and wherein the determining device determines that the vehicle is idling in view of an output from the vehicle velocity sensor.

10. The vehicle according to claim 9, wherein the vehicle velocity sensor and the engine rotational speed sensor, in combination, determine a gear position for the vehicle.

11. The vehicle according to claim 8, wherein, when the determining device determines idling of the vehicle and the engine rotational speed is greater than a predetermined engine rotational speed value for the idling state of the engine, the motor controller operates the electric motor in a power-generating mode to lower the engine rotational speed of the engine to the predetermined engine rotational speed value.

12. The vehicle according to claim 8, wherein said vehicle comprises a hybrid vehicle.

13. The vehicle according to claim 9, wherein said vehicle comprises a hybrid vehicle.

14. The vehicle according to claim 10, wherein said vehicle comprises a hybrid vehicle.

15. A motor control apparatus combined with an internal combustion engine and an electric motor, the motor control apparatus having both driving and power-generation functions, and having a determining device for determining an idling state of the engine, the motor control apparatus comprising an engine rotational speed detector for detecting an engine rotational speed, a control device for controlling the engine rotational at a predetermined engine rotational speed value, the control device varying the engine rotational speed by changing an operating state of the electric motor when the engine rotational speed sensed by a detection signal from the engine rotational speed detector varies from the predetermined engine rotational speed value for the idling state of the engine, wherein, in case of the idling state of the engine, when the engine rotational speed is lower than the predetermined engine rotational speed value, the control device controls to increase the engine rotational speed by setting the motor in an operation running state, and when the engine rotational speed decreases or does not increase, the control device stops the operation running state of the electric motor.

* * * * *